US011942700B2

(12) United States Patent
Shinojima et al.

(10) Patent No.: US 11,942,700 B2
(45) Date of Patent: Mar. 26, 2024

(54) ANTENNA APPARATUS AND WIRELESS COMMUNICATION APPARATUS

(71) Applicant: FCNT LIMITED, Yamato (JP)

(72) Inventors: Takahiro Shinojima, Yamato (JP); Yohei Koga, Yamato (JP); Satoshi Sakita, Yamato (JP); Tabito Tonooka, Yamato (JP); Yasumitsu Ban, Yamato (JP); Manabu Yoshikawa, Yamato (JP)

(73) Assignee: FCNT LIMITED, Yamato (JP)

( * ) Notice: Subject to any disclaimer, the term of this patent is extended or adjusted under 35 U.S.C. 154(b) by 149 days.

(21) Appl. No.: 17/725,758

(22) Filed: Apr. 21, 2022

(65) Prior Publication Data

US 2022/0247080 A1 Aug. 4, 2022

Related U.S. Application Data

(63) Continuation of application No. PCT/JP2019/041491, filed on Oct. 23, 2019.

(51) Int. Cl.
*H01Q 5/35* (2015.01)
*H01Q 5/357* (2015.01)
*H01Q 7/00* (2006.01)

(52) U.S. Cl.
CPC ............... *H01Q 7/00* (2013.01); *H01Q 5/357* (2015.01)

(58) Field of Classification Search
CPC ................................. H01Q 7/00; H01Q 5/357
USPC .......................................................... 343/713
See application file for complete search history.

(56) References Cited

U.S. PATENT DOCUMENTS 6,160,518 A 12/2000 Miyahara et al.
7,768,468 B2 * 8/2010 Gustafson .............. H01Q 7/005 343/866
2005/0153755 A1 7/2005 Suzuki et al.
2005/0270240 A1 12/2005 Qi et al.
2005/0270241 A1 12/2005 Qi et al.
2005/0270242 A1 12/2005 Qi et al.
2006/0208952 A1 9/2006 Qi et al.
2006/0214858 A1 9/2006 Qi et al.
2006/0220969 A1 10/2006 Qi et al.
(Continued)

FOREIGN PATENT DOCUMENTS

JP 2000-307321 A 11/2000
JP 2005-203877 A 7/2005
(Continued)

OTHER PUBLICATIONS

International Search Report dated Dec. 17, 2019, issued in counterpart International Application No. PCT/ JP2019/041491 (1 page).

*Primary Examiner* — Peguy Jean Pierre
(74) *Attorney, Agent, or Firm* — WHDA, LLP

(57) ABSTRACT

An antenna apparatus includes a ground substrate, a feeding point provided on the ground substrate, a first loop antenna of which one end is electrically connected to the feeding point and of which another end is electrically connected to the ground substrate and moreover which operates at a first frequency, and a second loop antenna of which both ends are respectively connected to a first end point and a second end point of the first loop antenna and which operates at a second frequency. A space between the first end point and the second end point forms a gap with a range in which the first loop antenna is capable of resonating at the first frequency.

12 Claims, 16 Drawing Sheets

(56) References Cited

U.S. PATENT DOCUMENTS

| | | | | |
|---|---|---|---|---|
| 2010/0271264 | A1* | 10/2010 | Li | H01Q 7/00 343/700 MS |
| 2015/0123855 | A1* | 5/2015 | Ryu | H01Q 1/24 343/702 |
| 2020/0083603 | A1* | 3/2020 | Wu | H01Q 7/00 |

FOREIGN PATENT DOCUMENTS

| | | | |
|---|---|---|---|
| JP | 2009-182973 | A | 8/2009 |
| JP | 2012-28906 | A | 2/2012 |

* cited by examiner

ANTENNA APPARATUS AND WIRELESS COMMUNICATION APPARATUS

CROSS-REFERENCE TO RELATED APPLICATION

This application is a continuation application of International Application PCT/JP2019/041491 filed on Oct. 23, 2019 and designated the U.S., the entire contents of which are incorporated herein by reference.

FIELD

The embodiments discussed herein are related to an antenna apparatus and a wireless communication apparatus.

BACKGROUND

Wireless communication apparatuses such as smartphones, tablet computers, and vehicles equipped with car-mounted antennas communicate using a plurality of frequencies in order to implement, for example, high-speed communication. To this end, wireless communication apparatuses are mounted with antenna devices which correspond to the plurality of frequencies.

For example, Japanese Laid-open Patent Publication No. 2009-182973 proposes an antenna which adjusts impedance by providing a part of a main loop conductor with a meander.

DOCUMENT OF PRIOR ART

[Patent Document]

[Patent document 1] Japanese Laid-open Patent Publication No. 2009-182973

SUMMARY

One aspect of the disclosed technique can be exemplified by an antenna apparatus such as that described below. The present antenna apparatus includes a ground substrate; a feeding point provided on the ground substrate; a first loop antenna of which one end is electrically connected to the feeding point and of which another end is electrically connected to the ground substrate and moreover which operates at a first frequency; and a second loop antenna of which both ends are respectively connected to a first end point and a second end point of the first loop antenna and which operates at a second frequency, wherein a space between the first end point and the second end point forms a gap with a range in which the first loop antenna is capable of resonating at the first frequency.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

Figure 1:
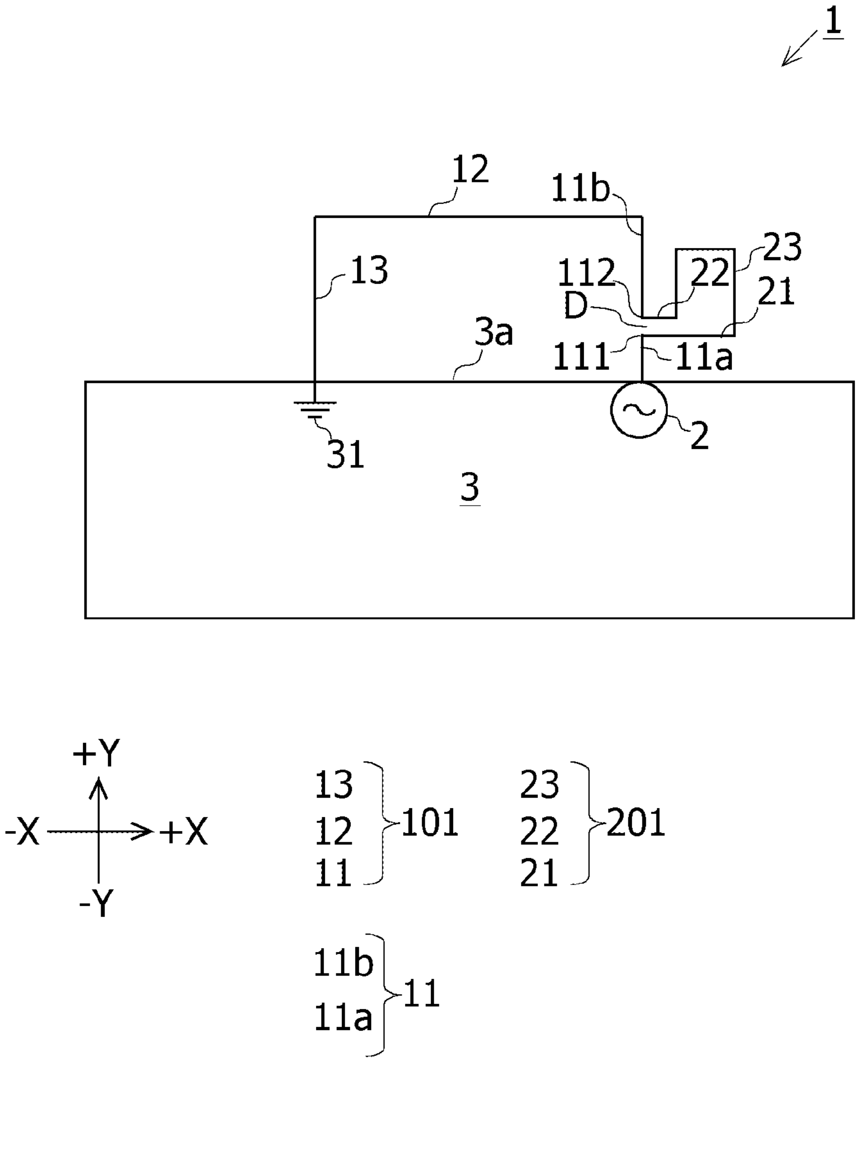
FIG. 1 is a diagram showing an example of an antenna according to an embodiment.

Further imparting of higher functions and further downsizing are being promoted with respect to wireless communication apparatuses. Due to the promotion of such imparting of higher functions and downsizing with respect to wireless communication apparatuses, spaces for providing an antenna apparatus inside the wireless communication apparatuses are becoming ever smaller. Therefore, a small-sized antenna apparatus capable of operating at a plurality of frequencies is desired.

An object of an aspect of the disclosed technique is to provide an antenna apparatus which is capable of operating at a plurality of frequencies and which can be manufactured in a small size and a wireless communication apparatus which is mounted with the antenna apparatus.

Hereinafter, an embodiment will be described. It is to be understood that configurations of the embodiment described below are illustrative and that the disclosed technique is not limited to the configurations of the embodiment. For example, an antenna apparatus according to the present embodiment is configured as described below.

The antenna apparatus according to the present embodiment includes:

a ground substrate;

a feeding point provided on the ground substrate;

a first loop antenna of which one end is electrically connected to the feeding point and of which another end is electrically connected to the ground substrate and moreover which operates at a first frequency; and a second loop antenna of which both ends are respectively connected to a first end point and a second end point of the first loop antenna and which operates at a second frequency, wherein a space between the first end point and the second end point forms a gap with a range in which the first loop antenna is capable of resonating at the first frequency.

The ground substrate is a grounded substrate. The first loop antenna is grounded by being electrically connected to the ground substrate. A gap is formed between the first end point and the second end point on the first loop antenna and an interval of the gap is set to a range in which the first loop antenna is capable of resonating at the first frequency. Setting the gap in this manner enables the first loop antenna to operate at the first frequency regardless of the presence of the gap. In addition, both ends of the second loop antenna are respectively connected to the first end point and the second end point. Forming the second loop antenna in this manner enables the second loop antenna to operate at the second frequency which differs from the first frequency.

Note that the space between the first end point and the second end point is preferably a gap that is 1/50 of the first frequency. In addition, the first end point and the second end point are preferably provided in a range of ¼ or less of the first frequency from the feeding point.

The present antenna apparatus may further include the following feature. A capacitor or an inductor is provided on an electric path between the first loop antenna and the ground substrate. The antenna apparatus with such a feature can change a frequency at which the first loop antenna resonates by appropriately adjusting a capacitance of the capacitor or an inductance of the inductor without changing physical lengths of the first loop antenna and the second loop antenna.

The present antenna apparatus may further include the following feature. The first loop antenna and the ground substrate are electrically connected to each other by a spring contact. Adopting a spring contact more reliably realizes the electric connection between the first loop antenna and the ground substrate.

The present antenna apparatus may further include the following feature. The first loop antenna is further electrically connected to the ground substrate at one or more locations on the first loop antenna. The antenna apparatus with such a feature enables a larger number of half-wavelength loop antennas to be provided inside the antenna apparatus.

The present antenna apparatus may further include the following feature. The first loop antenna is provided with two or more second loop antennas which are operated by radio waves with frequencies that differ from each other. With such a feature, radio waves at which the antenna apparatuses resonate can be increased while keeping a size of an entire antenna apparatus to around ½ wavelength of a wavelength of a radio wave with the first frequency.

The present antenna apparatus may further include the following feature. The antenna apparatus is mounted to a mobile terminal apparatus and at least a part of the first loop antenna is formed of a metal frame which constitutes an exterior of the mobile terminal apparatus. Examples of the mobile terminal apparatus include a mobile phone, a smartphone, a tablet computer, and a wearable computer. By using a metal external frame which constitutes an exterior of the mobile terminal apparatus as at least a part of the first loop antenna, the antenna apparatus with such a feature can reduce an area occupied by the antenna apparatus in a region defined by the metal frame. Therefore, the antenna apparatus with such a feature enables the mobile terminal apparatus to be downsized or enables a larger number of electronic components to be mounted to the mobile terminal apparatus. In addition, at least a part of the second loop antenna may be formed using Laser Direct Structuring (LDS) or a flexible substrate.

The present antenna apparatus may further include the following feature. The antenna apparatus further includes a first conductor device of which one end is connected to a connecting point of the first loop antenna and which is parallel to the ground substrate, wherein a length from a contact point which connects the other end of the first loop antenna and the ground substrate to another end of the first conductor device via the first loop antenna is ¼ wavelength of a third frequency. The antenna apparatus with such a feature is capable of causing the first conductor device to operate as a monopole antenna.

In addition, the disclosed technique may be a wireless communication apparatus mounted with an antenna apparatus having any of the features described above.

Hereinafter, an embodiment will be further described with reference to the drawings. FIG. 1 is a diagram showing an example of an antenna according to the embodiment. An antenna 1 illustrated in FIG. 1 includes a first loop antenna 101, a second loop antenna 201, and a ground substrate 3. Hereinafter, in the present specification, a right-hand side when facing FIG. 1 will be referred to as a +X direction, a left-hand side when facing FIG. 1 will be referred to as a −X direction, above when facing FIG. 1 will be referred to as a +Y direction, and below when facing FIG. 1 will be referred to as a −Y direction.

The ground substrate 3 has a grounded ground surface 3*a*. For example, the ground substrate 3 may be a printed substrate to which various electronic components are to be mounted. The ground substrate 3 also includes a feeding point 2 for feeding power to the antenna 1. An entire surface of the ground substrate 3 may constitute the ground surface 3*a*.

The first loop antenna 101 is a loop antenna which includes a feed line 11, a first conductor device 12, and a second conductor device 13 and which operates at a first frequency $f_1$. While the first loop antenna 101 is formed in a rectangular shape in FIG. 1, the shape of the first loop antenna 101 is not limited to a rectangular shape. The first conductor device 12 is a conductor device which extends approximately parallel to the ground surface 3*a* of the ground substrate 3 at a position separated by a predetermined distance from the ground substrate 3. A +X-side end of the first conductor device 12 is electrically connected to the feeding point 2 by the feed line 11. In FIG. 1, the first conductor device 12 and the feed line 11 are approximately orthogonal to each other.

The second conductor device 13 is a conductor device which electrically connects a −X-side end of the first conductor device 12 and the ground surface 3*a* of the ground substrate 3 to each other. The second conductor device 13 is approximately orthogonal to the first conductor device 12 and the ground surface 3*a*. A +Y-side end of the second conductor device 13 is electrically connected to the first conductor device 12 and a −Y-side end of the second conductor device 13 is electrically connected to the ground surface 3*a*. Hereinafter, in the present specification, a portion where the second conductor device 13 connects to the ground surface 3*a* will be referred to as a ground 31 for the sake of convenience. The second conductor device 13 may be a spring contact.

The feed line 11 is a conductor device which electrically connects the +X-side end of the first conductor device 12 and the feeding point 2 to each other. The feed line 11 is approximately orthogonal to the first conductor device 12 and the ground surface 3*a*. A +Y-side end of the feed line 11 is electrically connected to the first conductor device 12 and a −Y-side end of the feed line 11 is electrically connected to the feeding point 2.

The feed line 11 includes a feed line 11*a* and a feed line 11*b*. A −Y-side end of the feed line 11*a* is electrically connected to the feeding point 2 and a +Y-side end of the feed line 11*a* constitutes a first end point 111. A −Y-side end of the feed line 11*b* constitutes a second end point 112 and a +Y-side end of the feed line 11*b* is electrically connected to the +X-side end of the first conductor device 12. A gap D with a range in which the first loop antenna 101 is capable of resonating at the first frequency $f_1$ is formed between the first end point 111 and the second end point 112. A distance between the first end point 111 and the second end point 112 (a size of the gap D) is, for example, 1/50 of the first frequency $f_1$. For example, the first end point 111 and the second end point 112 are provided in a range of ¼ or less of the first frequency $f_1$ from the feeding point 2.

The second loop antenna 201 is a loop antenna which includes a first connecting device 21, a second connecting device 22, and a flexed device 23 and which operates at a second frequency $f_2$. The first connecting device 21 is a conductor device which is parallel to the ground surface 3*a* of the ground substrate 3 and of which a −X-side end is connected to the first end point 111 of the feed line 11. The second connecting device 22 is a conductor device which is parallel to the ground surface 3*a* and of which a −X-side end is connected to the second end point 112 of the feed line 11. The flexed device 23 is a conductor device which connects, in a loop shape, the +X-side end of the first connecting device 21 and a +X-side end of the second connecting device 22 to each other. While the flexed device 23 is formed in a rectangular shape in FIG. 1, the flexed device 23 may be formed by smooth curves. In addition, the first connecting device 21 and the second connecting device 22 may be omitted and the first end point 111 and the second end point 112 of the feed line 11 may be connected by the flexed device 23. While the first connecting device 21 and the second connecting device 22 are parallel to the ground surface 3*a* of the ground substrate 3 in FIG. 1, the first connecting device 21 and the second connecting device 22 are not limited to being parallel to the ground surface 3*a*.

Figure 2:
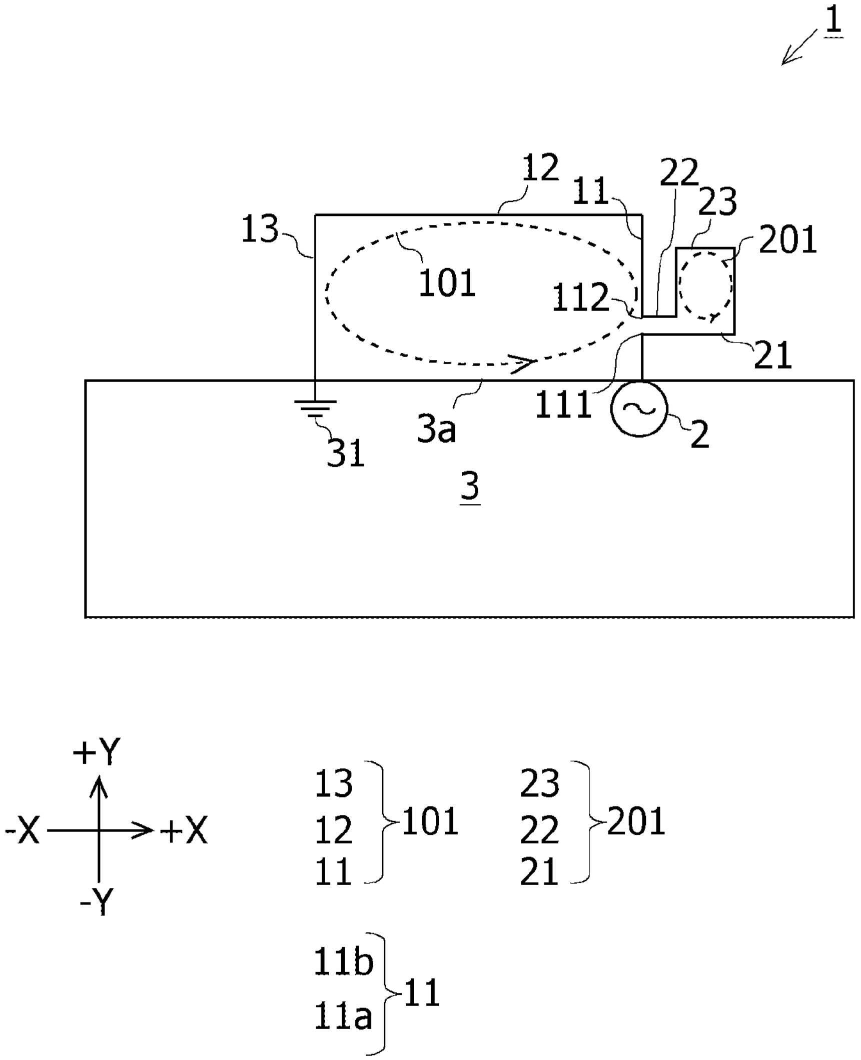
FIG. 2 is a diagram schematically illustrating a first loop antenna and a second loop antenna which are included in the antenna according to the embodiment.

FIG. 2 is a diagram schematically illustrating a first loop antenna and a second loop antenna which are included in the antenna according to the embodiment. The first loop antenna 101 is a loop antenna of half wavelength and a path length from the feeding point 2 to the ground 31 via the feed line 11, the first conductor device 12, and the second conductor device 13 is approximately equal to ½ of a wavelength at the first frequency $f_1$. The second loop antenna 201 is a loop antenna of 1 wavelength which is formed by a path from the first end point 111 to the second end point 112 via the first connecting device 21, the flexed device 23, and the second connecting device 22. An antenna length of the second loop antenna 201 is approximately equal to a wavelength at the second frequency $f_2$.

In this case, as is evident from reference to FIG. 2, the antenna length of the first loop antenna 101 is longer than the antenna length of the second loop antenna 201. Therefore, a relationship between the frequency $f_1$ and the frequency $f_2$ is expressed as (frequency $f_2$)>(frequency $f_1$).

Working Effects of Embodiment

The antenna 1 according to the embodiment includes the first loop antenna 101 and the second loop antenna 201. The second loop antenna is connected to the first end point 111 and the second end point 112 of the first loop antenna 101. In this case, an interval of the gap D (an interval between the first end point 111 and the second end point 112) is set to a range in which the first loop antenna 101 is capable of resonating at the first frequency $f_1$. Therefore, the first loop antenna 101 can be used as a loop antenna of half wavelength which operates at the first frequency $f_1$. On the other hand, by setting a path length from the first end point 111 to the second end point 112 via the first connecting device 21, the flexed device 23, and the second connecting device 22 approximately equal to the wavelength at the second frequency $f_2$, the second loop antenna 201 can be used as a loop antenna of 1 wavelength which operates at the second frequency $f_2$.

First Modification

Figure 3:
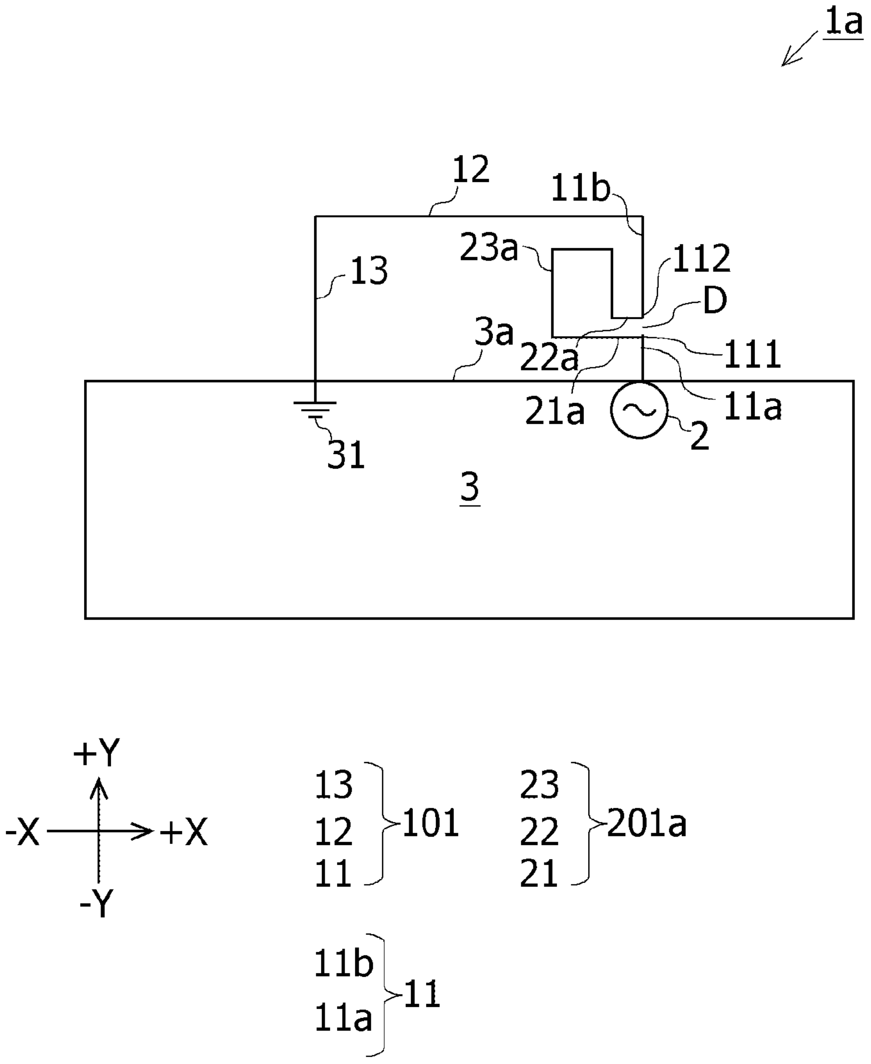
FIG. 3 is a diagram showing an example of an antenna according to a first modification.

While the second loop antenna 201 is provided outside of a region defined by the first loop antenna 101 in the embodiment, alternatively, the second loop antenna 201 may be provided inside the region defined by the first loop antenna 101. FIG. 3 is a diagram showing an example of an antenna according to a first modification. In an antenna 1*a* according to the first modification, a first connecting device 21*a* is a conductor device which is parallel to the ground surface 3*a* of the ground substrate 3 and of which a +X-side end is connected to the first end point 111 of the feed line 11. A second connecting device 22*a* is a conductor device which is parallel to the ground surface 3*a* and of which a +X-side end is connected to the second end point 112 of the feed line 11. A flexed device 23*a* is a conductor device which connects, in a loop shape, a −X-side end of the first connecting device 21*a* and a −X-side end of the second connecting device 22*a* to each other.

According to such a configuration, a second loop antenna 201*a* is provided inside the region defined by the first loop antenna 101. Adopting such a configuration enables the antenna 1*a* according to the first modification to be more downsized than the antenna 1 according to the embodiment.

Second Modification

Figure 4:
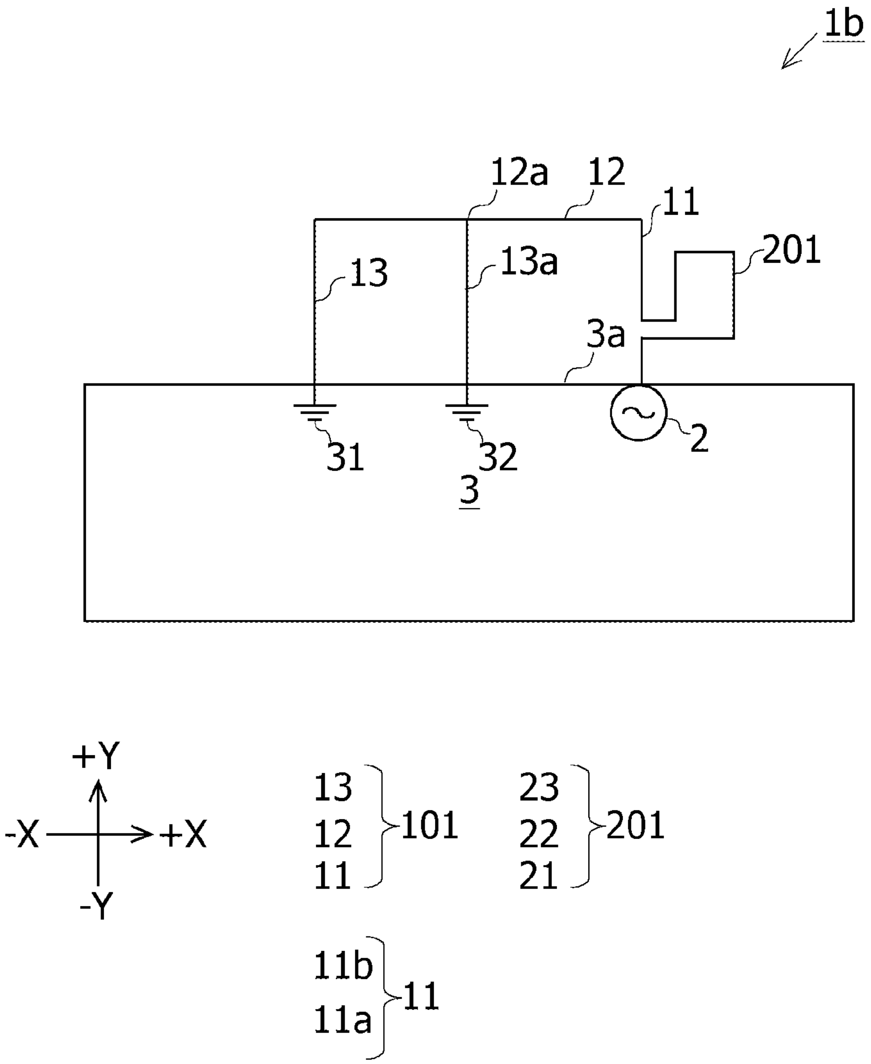
FIG. 4 is a diagram showing an example of an antenna according to a second modification.

FIG. 4 is a diagram showing an example of an antenna according to a second modification. An antenna 1*b* illustrated in FIG. 4 differs from the antenna 1 according to the embodiment in that a branch point 12*a* between the −X-side end and the +X-side end of the first conductor device 12 and the ground surface 3*a* are electrically connected to each other by a third conductor device 13*a*. Hereinafter, in the present specification, a portion where the third conductor device 13*a* and the ground surface 3*a* are connected to each other will be referred to as a ground 32 for the sake of convenience.

Figure 5:
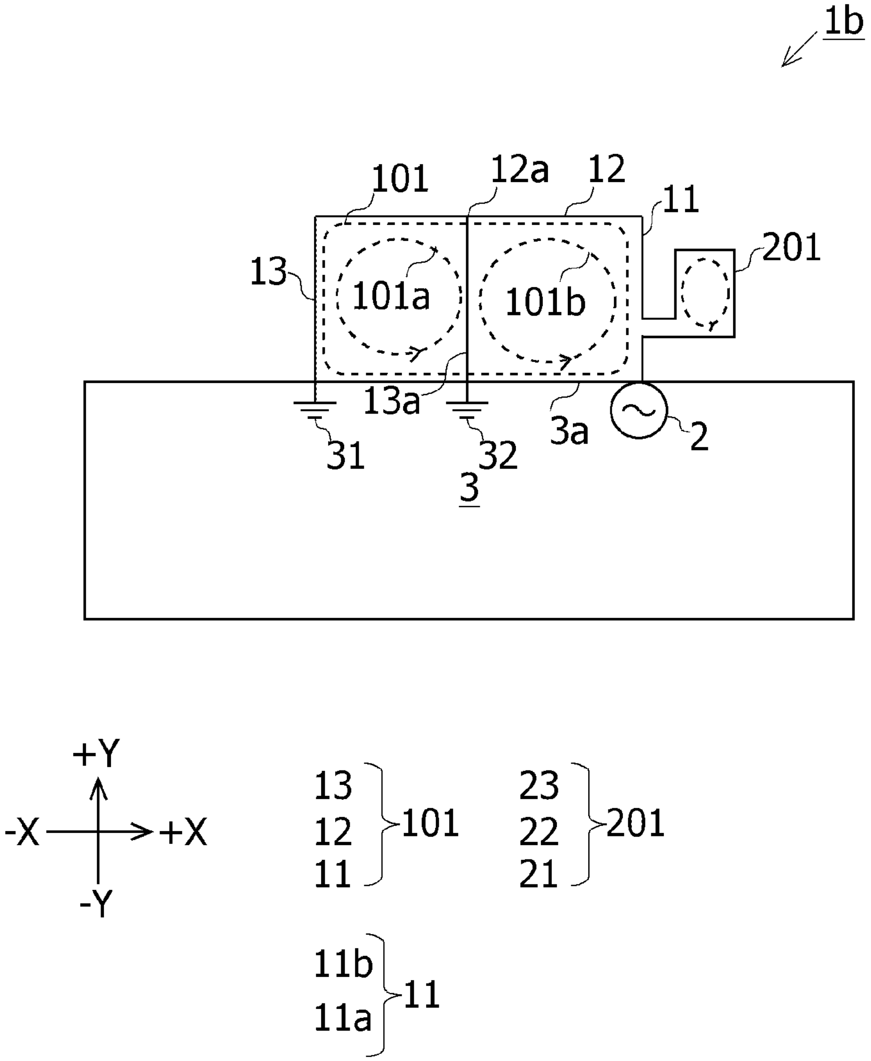
FIG. 5 is a diagram schematically showing a loop antenna which operates on the antenna according to the second modification.

FIG. 5 is a diagram schematically showing a loop antenna which operates on the antenna according to the second modification. As is evident from reference to FIG. 5, the antenna 1*b* according to the second modification has loop antennas 101*a* and 101*b* in addition to the loop antennas 101 and 201. The loop antenna 101*a* is a half-wavelength loop antenna which is formed by a path from the feeding point 2 to the ground 32 via the feed line 11, the first conductor device 12, the branch point 12*a*, and the third conductor device 13*a*. In addition, the loop antenna 101*b* is a half-wavelength loop antenna which is formed by a path from the ground 32 to the ground 31 via the branch point 12*a*, the first conductor device 12, and the second conductor device 13. Appropriately determining a position of the branch point 12*a* enables antenna lengths of the loop antennas 101*a* and 101*b* to be set and, by extension, enables a frequency of a radio wave at which the loop antennas 101*a* and 101*b* resonate to be set.

While the first conductor device 12 is electrically connected to the ground surface 3*a* by the third conductor device 13*a* from the branch point 12*a* at one location provided between the −X-side end and the +X-side end of the first conductor device 12 in FIGS. 4 and 5, alternatively, branch points may be provided in plurality and each of the branch points provided in plurality and the ground surface 3*a* may be electrically connected to each other by a conductor device. Adopting such a design enables loop antennas which operate on the antenna 1*b* to be further increased.

Third Modification

Figure 6:
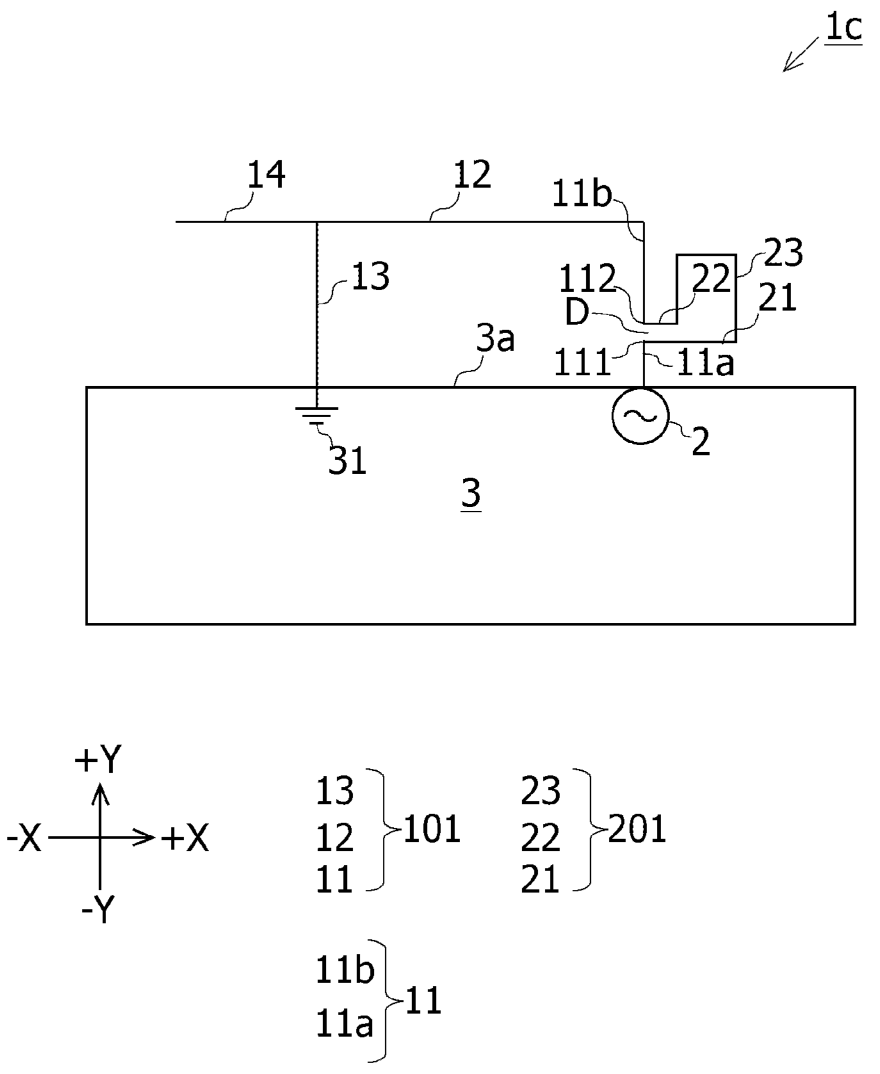
FIG. 6 is a diagram showing an example of an antenna according to a third modification.

FIG. 6 is a diagram showing an example of an antenna according to a third modification. An antenna 1*c* illustrated in FIG. 6 differs from the antenna 1 according to the embodiment in that the antenna 1*c* further includes a fourth conductor device 14.

The fourth conductor device 14 is a device which is parallel to the ground surface 3*a* and of which a −X-side end is connected to the −X-side end of the first conductor device 12. A length of the fourth conductor device 14 from the ground 31 to the −X-side end of the fourth conductor device 14 via the second conductor device 13 is set equal to ¼ of a frequency at which the fourth conductor device 14 resonates.

Figure 7:
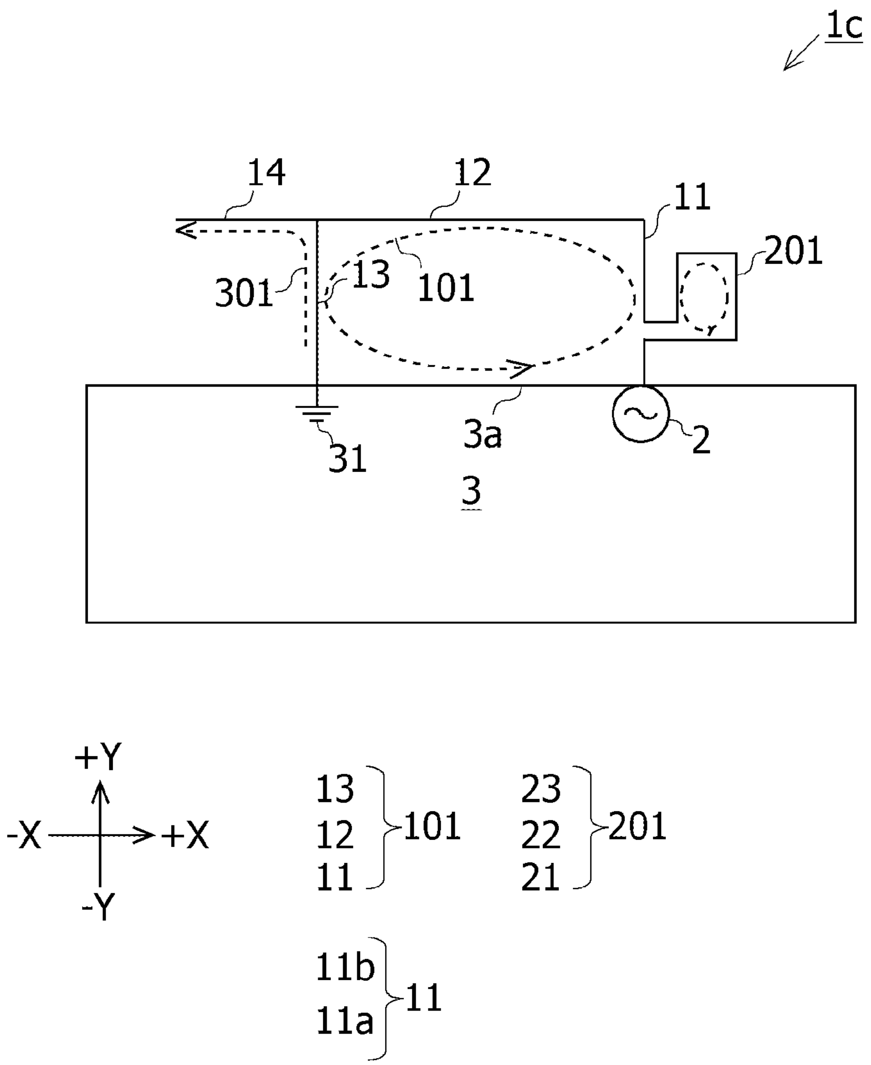
FIG. 7 is a diagram schematically showing a loop antenna and a monopole antenna which operate on the antenna according to the third modification.

FIG. 7 is a diagram schematically showing a loop antenna and a monopole antenna which operate on the antenna according to the third modification. As is evident from reference to FIG. 7, the antenna 1*c* according to the third modification has a monopole antenna 301 in addition to the loop antennas 101 and 201. The monopole antenna 301 is a monopole antenna of ¼ wavelength which is formed by a path from the ground 31 to the −X-side end of the fourth conductor device 14 via the second conductor device 13.

Fourth Modification

Figure 8:
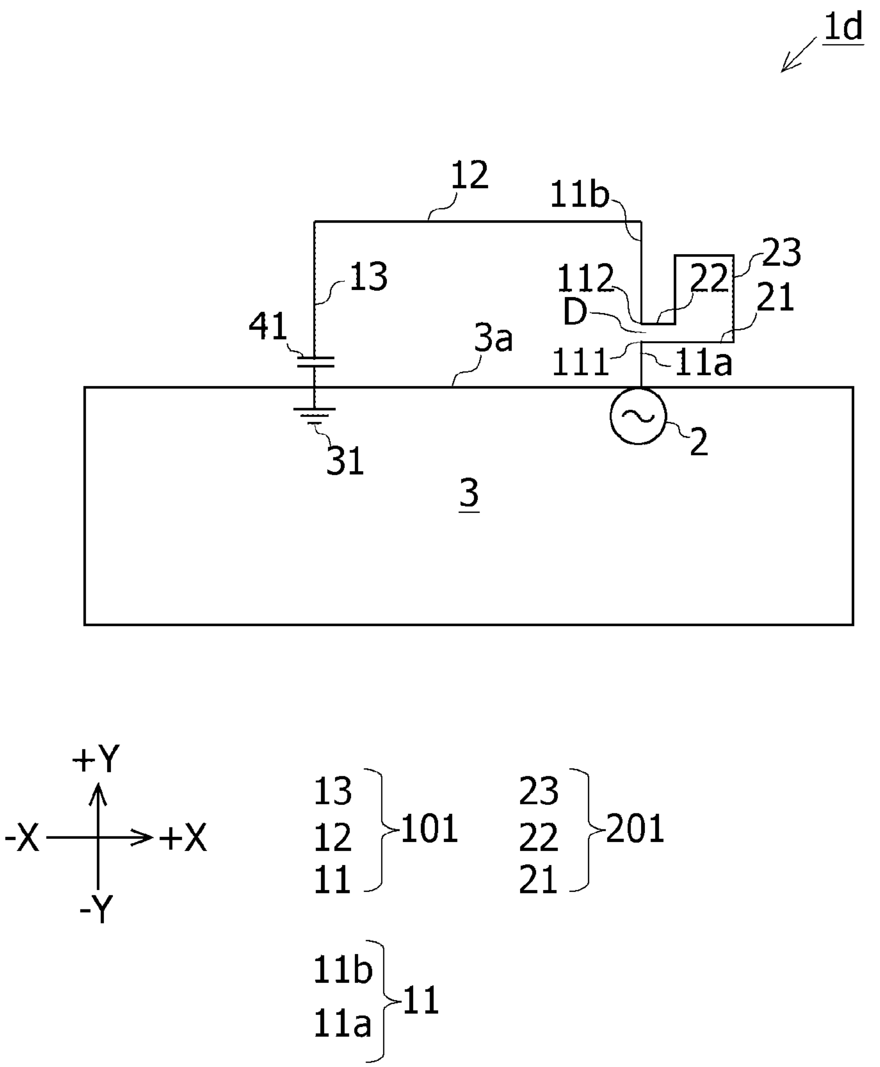
FIG. 8 is a diagram showing an example of an antenna according to a fourth modification.

FIG. 8 is a diagram showing an example of an antenna according to a fourth modification. An antenna 1*d* illustrated in FIG. 8 is provided with a capacitor 41 between the second conductor device 13 and the ground 31.

For example, the capacitor 41 is a reduction capacitor. Appropriately setting a capacitance of the capacitor 41 enables, for example, an electric antenna length of the loop antenna 101 to be reduced. In other words, by providing the capacitor 41 between the second conductor device 13 and the ground 31, a frequency at which the loop antenna 101 resonates can be made higher than the frequency $f_1$.

Fifth Modification

Figure 9:
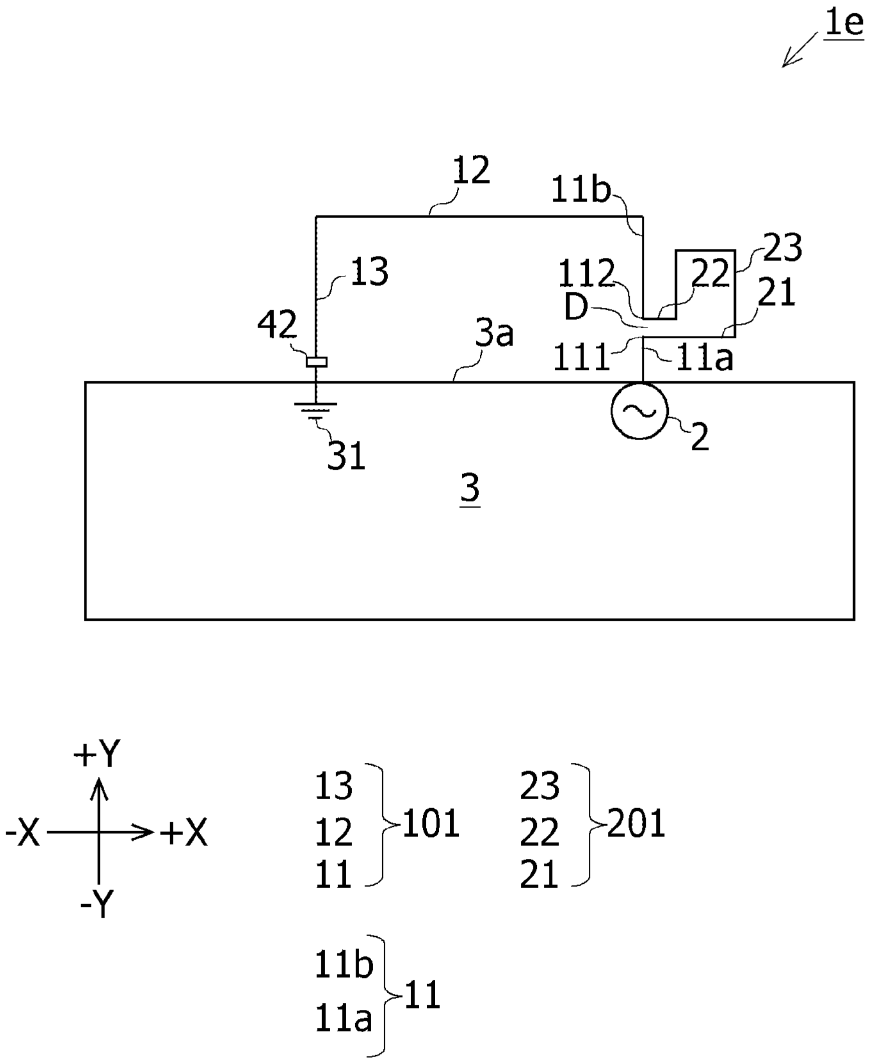
FIG. 9 is a diagram showing an example of an antenna according to a fifth modification.

FIG. 9 is a diagram showing an example of an antenna according to a fifth modification. An antenna 1*e* illustrated in FIG. 9 is provided with an inductor 42 between the second conductor device 13 and the ground 31.

For example, the inductor 42 is an extension coil. Appropriately setting an inductance of the inductor 42 enables, for example, the electric antenna length of the loop antenna 101 to be extended. Specifically, by providing the inductor 42 between the second conductor device 13 and the ground 31, a frequency at which the loop antenna 101 resonates can be made lower than the frequency $f_1$.

Sixth Modification

Figure 10:
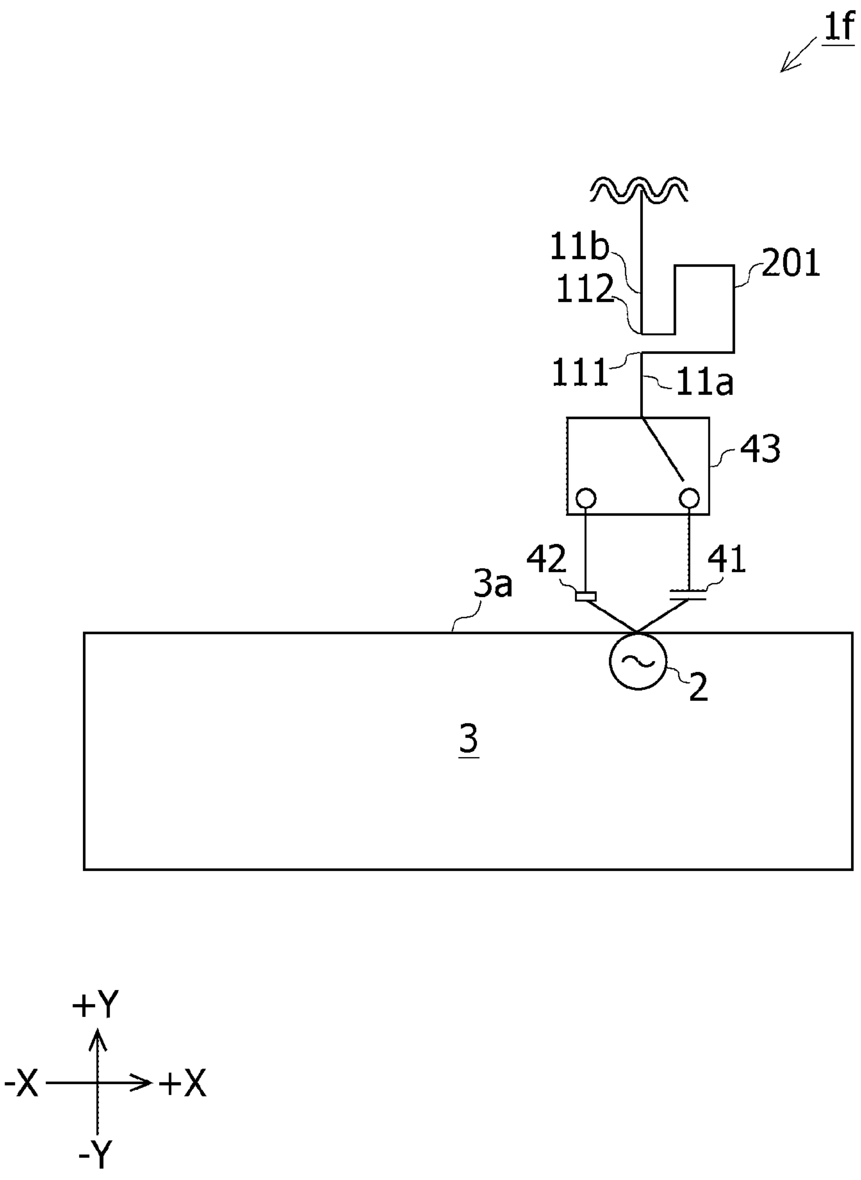
FIG. 10 is a partial view of an example of an antenna according to a sixth modification.

FIG. 10 is a partial view of an example of an antenna according to a sixth modification. FIG. 10 illustrates a vicinity of the feeding point 2 of an antenna if according to the sixth modification. In the antenna 1*f*, the capacitor 41 and the inductor 42 are connected in parallel between the feed line 11*a* and the feeding point 2 and a switch device 43 for switching between the capacitor 41 and the inductor 42 is provided. By switching the switch device 43, switching between the capacitor 41 and the inductor 42 can be performed and, by extension, a frequency at which the loop antenna 101 resonates can be changed. Note that portions other than the switch device 43 of the antenna if are similar to those of the antenna 1 according to the embodiment.

Seventh Modification

Antennas including a single second loop antenna 201 have been described in the embodiment and the modifications explained above. In a seventh modification, an antenna including two or more second loop antennas will be described.

Figure 11:
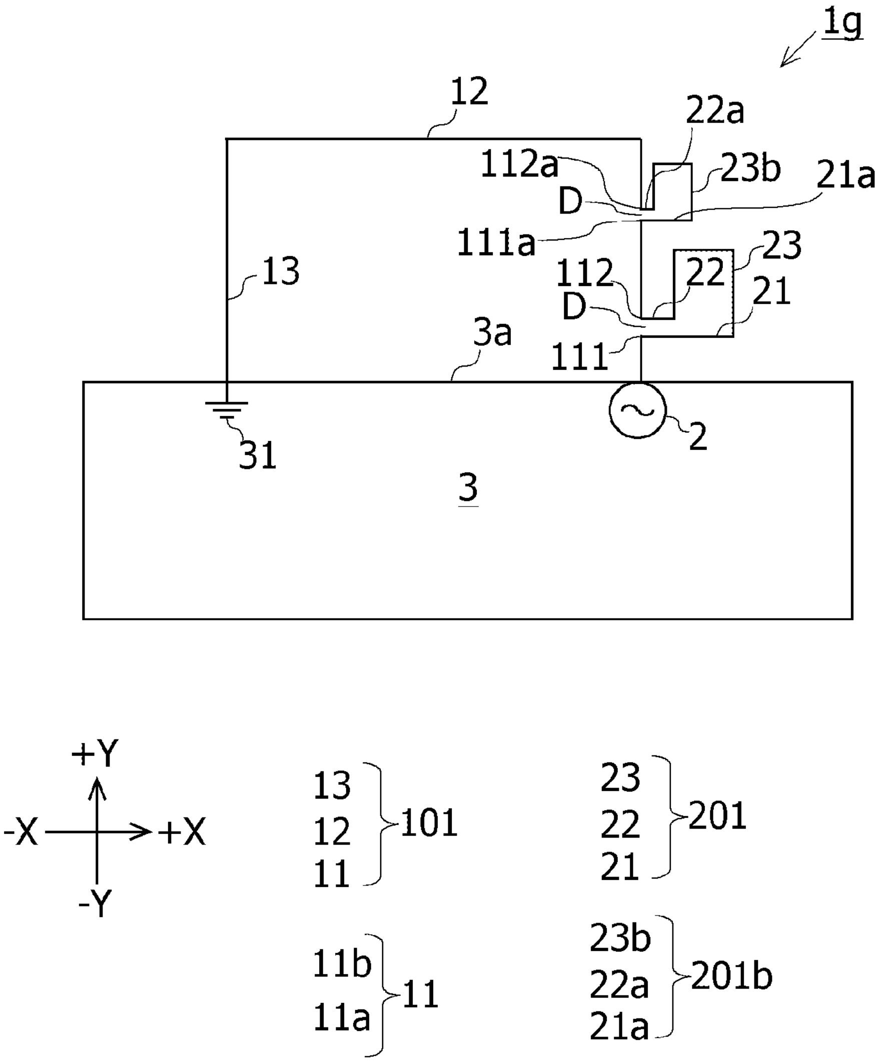
FIG. 11 is a diagram showing an example of an antenna according to a seventh modification.

FIG. 11 is a diagram showing an example of the antenna according to the seventh modification. In an antenna 1*g* illustrated in FIG. 11, in addition to the second loop antenna 201, a second loop antenna 201*b* is provided midway along a path of the first loop antenna 101. The second loop antenna 201*b* is formed by connecting a flexed device 23*b* via the first connecting device 21*a* and the second connecting device 22*a* at each of a first end point 111*a* and a second end point 112*a*. A gap D between the first end point 111*a* and the second end point 112*a* is formed so that the first loop antenna 101 can resonate at the first frequency $f_1$ in a similar manner to the gap D between the first end point 111 and the second end point 112.

Figure 12:
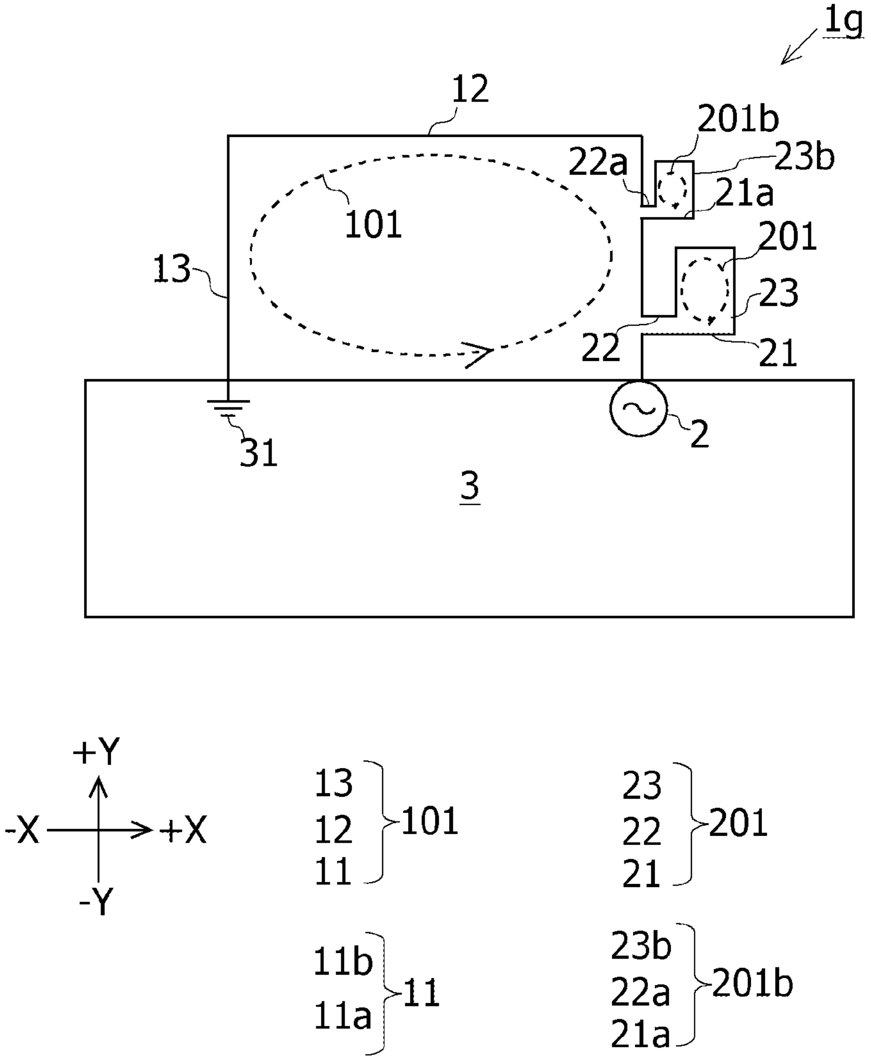
FIG. 12 is a diagram schematically illustrating a loop antenna included in the antenna according to the seventh modification.

FIG. 12 is a diagram schematically illustrating a loop antenna included in the antenna according to the seventh modification. The second loop antenna 201*b* is a loop antenna of 1 wavelength which is formed by a path from the first end point 111*a* to the second end point 112*a* via the first connecting device 21*a*, the flexed device 23*b*, and the second connecting device 22*a*. An antenna length of the second loop antenna 201*b* is approximately equal to a wavelength of a radio wave which causes the second loop antenna 201*b* to operate.

Note that FIGS. 11 and 12 illustrate an antenna including two second loop antennas 201 and 201*b*. However, the number of second loop antennas included in the antenna 1*g* according to the seventh modification is not limited to two. In the antenna 1*g*, two or more second loop antennas which operate at frequencies that differ from each other may be provided midway along the path of the first loop antenna 101. By providing the second loop antenna in plurality, the antenna according to the seventh modification is capable of increasing radio waves which enable the antenna to resonate while keeping a size of the entire antenna to around ½ wavelength of a wavelength of a radio wave with the first frequency.

Application Example

Figure 13:
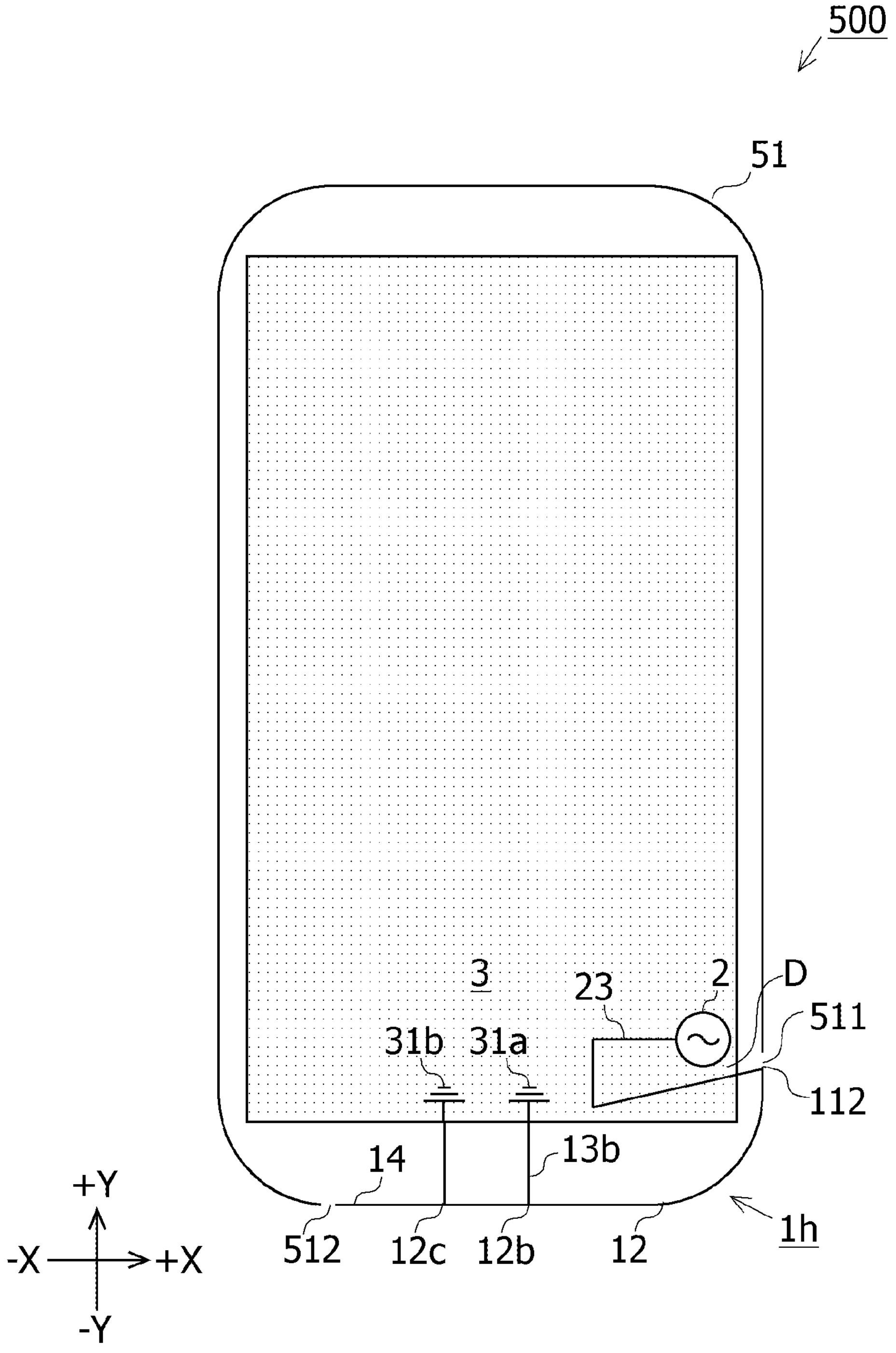
FIG. 13 is a diagram showing an application example.

FIG. 13 is a diagram showing an application example. The application example illustrated in FIG. 13 represents an example in which an antenna 1*h* combining the second modification and the third modification is applied to a smartphone 500. FIG. 13 illustrates a state where a display-side case of the smartphone 500 has been opened.

The smartphone 500 is a portable information processing apparatus which includes a processor, a memory, and the like. The smartphone 500 performs radio communication with an external apparatus using the antenna 1*h*. In the smartphone 500, a side surface (periphery) thereof is surrounded by a frame-like metal frame 51. The metal frame 51 is an exterior which covers the side surface of the smartphone 500. Corners of the metal frame 51 are formed in round arc shapes. The ground substrate 3 is housed in a region defined by the metal frame 51. In the smartphone 500, a speaker used for communication by telephone is provided on an upper side (+Y side) and a microphone used for communication by telephone is provided on a lower side (−Y side).

In the smartphone 500, a part of the metal frame 51 is used as the antenna 1*h*. In FIG. 13, the antenna 1*h* is provided on a lower side of the smartphone 500. As illustrated in FIG. 13, a space between a region used as the antenna 1*h* and another region among the metal frame 51 is provided with slits 511 and 512. A first conductor device 12 is electrically separated by the slit 511 from the region not used as the antenna 1*h* among the metal frame 51. A third conductor device 14*a* is electrically separated by the slit 512 from the region not used as the antenna 1*h* among the metal frame 51.

In the smartphone 500, a portion of a corner formed on an arc in the metal frame 51 is used as the first conductor device 12. In this manner, by also using the metal frame 51 as a conductor device of the antenna 1*h*, an area occupied by the antenna 1*h* in a region defined by the metal frame 51 can be reduced.

The flexed device 23 used as the second loop antenna of the antenna 1*h* is formed on the ground substrate 3 using, for example, Laser Direct Structuring (LDS) or a flexible substrate. One end of the flexed device 23 is electrically connected to the feeding point 2 and another end thereof is electrically connected to the +Y-side end of the first conductor device 12.

A branch point 12*c* is provided at the −X-side end of the first conductor device 12. In addition, a branch point 12*b* is provided in a range of the branch point 12*c* and the +X-side end of the first conductor device 12. The branch point 12*b* and the ground substrate 3 are electrically connected by a third conductor device 13*b*. In addition, the branch point 12*c* and the ground substrate 3 are electrically connected by a third conductor device 13*c*. A range from the branch point 12*c* to the slit 512 in the −X direction is used as the fourth conductor device 14. The branch points 12*b* and 12*c* may be spring contacts. Hereinafter, in the present specification, a portion where the third conductor device 13*b* and the ground surface 3*a* are connected to each other will be referred to as a ground 31*a* for the sake of convenience. In a similar manner, a portion where the third conductor device 13*c* and the ground surface 3*a* are connected to each other will be referred to as a ground 31*b*.

Figure 14:
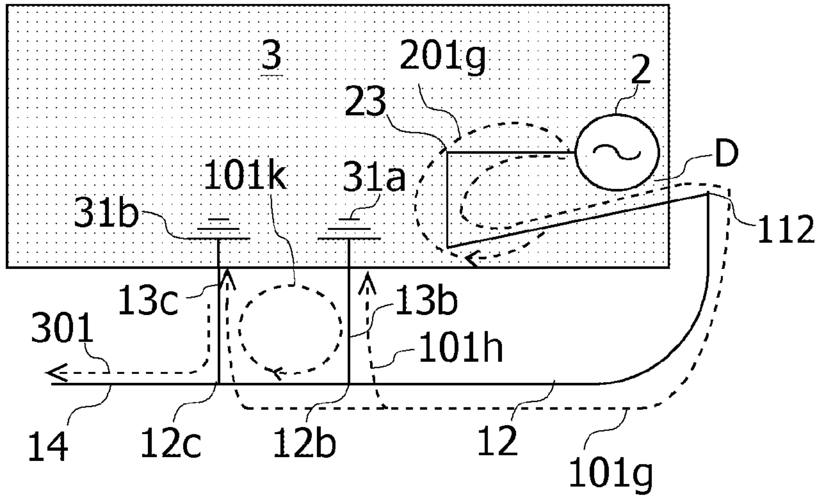
FIG. 14 is a diagram of a region near an antenna having been excerpted from a smartphone according to the application example.

FIG. 14 is a diagram of a region near an antenna having been excerpted from a smartphone according to the application example. The antenna 1*h* includes loop antennas 101*g*, 101*h*, 101*k*, and 201*g* and the monopole antenna 301. The loop antenna 101*g* operates as a loop antenna for a frequency $f_{71}$ by setting a length from the feeding point 2 to the ground 31*b* via the flexed device 23, the first conductor device 12, the branch point 12*c*, and the third conductor device 13*c* so as to equal ½ wavelength of a wavelength of the frequency $f_{71}$. For example, the frequency $f_{71}$ is 700 MHz.

The loop antenna 101*h* operates as a loop antenna for a frequency $f_{72}$ by setting a length from the feeding point 2 to the ground 31*a* via the flexed device 23, the first conductor device 12, the branch point 12*b*, and the third conductor device 13*b* so as to equal ½ wavelength of a wavelength of the frequency $f_{72}$. For example, the frequency $f_{72}$ is 900 MHz.

The loop antenna 101*k* operates as a loop antenna for a frequency $f_{73}$ by setting a length from the ground 31*a* to the ground 31*b* via the third conductor device 13*b*, the branch point 12*b*, the first conductor device 12, the branch point 12*c*, and the third conductor device 13*c* so as to equal ½ wavelength of a wavelength of the frequency $f_{73}$. For example, the frequency $f_{73}$ is 4500 MHz.

The loop antenna 201*g* operates as a loop antenna for a frequency $f_{74}$ by setting a length from the feeding point 2 to the second end point 112 via the flexed device 23 so as to equal 1 wavelength of the frequency $f_{74}$. For example, the frequency $f_{74}$ is 2000 MHz.

The monopole antenna 301 operates as a loop antenna for a frequency $f_{75}$ by setting a length from the ground 31*b* to the −X-side end of the fourth conductor device 14 via the third conductor device 13*c* and the branch point 12*c* so as to equal ¼ wavelength of a wavelength of the frequency $f_{75}$. For example, the frequency $f_{75}$ is 5000 MHz. The antenna 1*h* with such a feature can be used at four frequencies which differ from each other.

Figure 15:
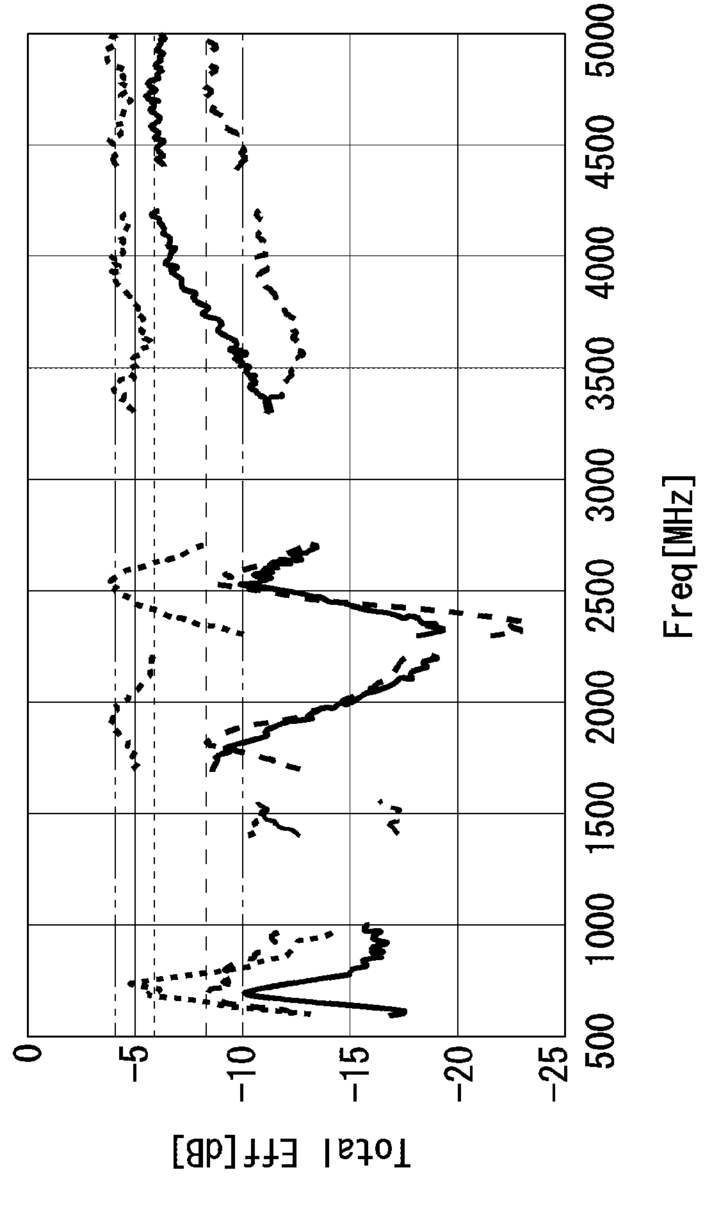
FIG. 15 is a diagram illustrating total efficiency of the antenna used in the application example.

FIG. 15 is a diagram illustrating total efficiency of the antenna used in the application example. An ordinate in FIG. 15 illustrates total efficiency (dB) while an abscissa illustrates frequency (MHz). With reference to FIG. 15, given that the graph peaks near the frequency $f_{71}$, near the frequency $f_{72}$, near the frequency $f_{73}$, near the frequency $f_{74}$, and near the frequency $f_{75}$, it can be understood that total efficiency is high.

Evaluation of Gap D

Figure 16:
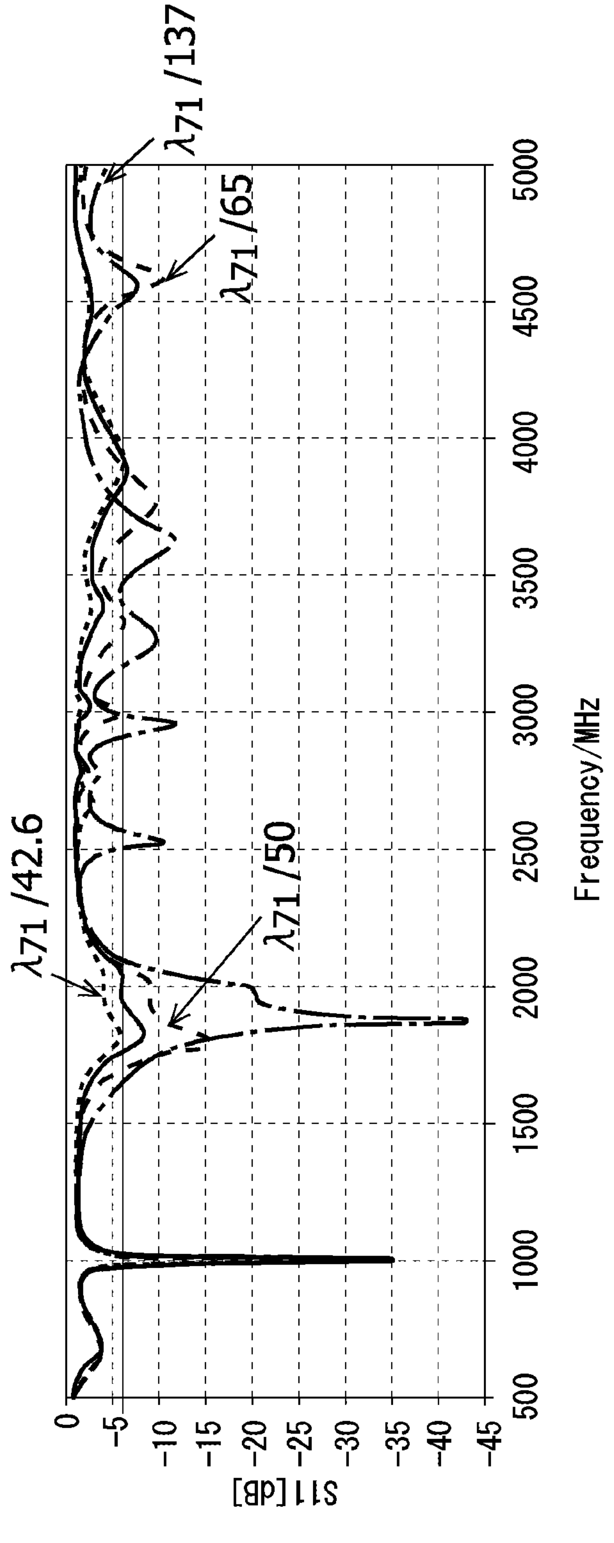
FIG. 16 is a diagram illustrating a variation of S11 when changing a gap D.

An evaluation of a variation of S11 of the antenna 1*g* when changing an interval of the gap D has been carried out and will now be explained. FIG. 16 is a diagram illustrating a variation of S11 when changing the gap D. An ordinate in FIG. 16 illustrates S11 (dB) while an abscissa illustrates frequency (MHz). In the present evaluation, the frequency $f_{71}$ at which the loop antenna 101*g* is operated is set to 700 MHz and the frequency $f_{74}$ at which the loop antenna 201*g* is operated is set to 2000 MHz. In the evaluation illustrated in FIG. 16, a case where the interval of the gap D is set to four gaps, namely, $\lambda_{71}/137$, $\lambda_{71}/65$, $\lambda_{71}/50$, and $\lambda_{71}/42.6$ is evaluated. In the present evaluation, relative permittivity of each conductor device is set to 3.0. As is evident from reference to FIG. 16, by setting the gap D to 1/50 or less of the wavelength of the frequency $f_{71}$ used by the loop antenna 101*h*, a value (S11 of 6 dB or lower) that is preferable as an antenna for a smartphone can be realized with respect to any of the frequency $f_{71}$ and the frequency $f_{74}$.

The embodiment and the modifications disclosed above can be combined with each other.

The disclosed technique can provide an antenna apparatus which is capable of operating at a plurality of frequencies and which can be manufactured in a small size and a wireless communication apparatus which is mounted with the antenna apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An antenna apparatus, comprising:

a ground substrate;

a feeding point provided on the ground substrate;

a first loop antenna of which one end is electrically connected to the feeding point and of which another end is electrically connected to the ground substrate and moreover which operates at a first frequency; and a second loop antenna of which both ends are respectively connected to a first end point and a second end point of the first loop antenna and which operates at a second frequency, wherein a space between the first end point and the second end point forms a gap with a range in which the first loop antenna is capable of resonating at the first frequency.

2. The antenna apparatus according to claim 1, wherein the space between the first end point and the second end point forms a gap that is 1/50 of the first frequency.

3. The antenna apparatus according to claim 1, wherein the first end point and the second end point are provided in a range of ¼ or less of the first frequency from the feeding point.

4. The antenna apparatus according to claim 1, wherein a capacitor or an inductor is provided on an electric path between the first loop antenna and the ground substrate.

5. The antenna apparatus according to claim 1, wherein a switch which switches between the capacitor and the inductor to be connected to the feeding point is interposed between the feeding point and the first loop antenna.

6. The antenna apparatus according to claim 1, wherein the first loop antenna and the ground substrate are electrically connected to each other by a spring contact.

7. The antenna apparatus according to claim 1, wherein the first loop antenna is further electrically connected to the ground substrate at one or more locations on the first loop antenna.

8. The antenna apparatus according to claim 1, wherein the first loop antenna is provided with two or more second loop antennas which are operated by radio waves with frequencies that differ from each other.

9. The antenna apparatus according to claim 1, wherein the antenna apparatus is mounted to a mobile terminal apparatus, and at least a part of the first loop antenna is formed of a metal frame which constitutes an exterior of the mobile terminal apparatus.

10. The antenna apparatus according to claim 1, wherein the antenna apparatus is mounted to a mobile terminal apparatus, and at least a part of the second loop antenna is formed using Laser Direct Structuring (LDS) or a flexible substrate.

11. The antenna apparatus according to claim 1, further comprising a first conductor device of which one end is connected to a connecting point of the first loop antenna and which is parallel to the ground substrate, wherein a length from a contact point which connects the other end of the first loop antenna and the ground substrate to each other to another end of the first conductor device via the first loop antenna is ¼ wavelength of a third frequency.

12. A wireless communication apparatus mounted with the antenna apparatus according to claim 1.

* * * * *